United States Patent
Miksa et al.

(10) Patent No.: US 9,052,207 B2
(45) Date of Patent: Jun. 9, 2015

(54) SYSTEM AND METHOD FOR VEHICLE NAVIGATION USING LATERAL OFFSETS

(75) Inventors: Krzysztof Miksa, Lodz (PL); Krzysztof Smiechowicz, Lodz (PL)

(73) Assignee: TomTom Polska Sp. z o.o., Warsaw ( * ) Notice: Subject to any disclaimer, the term of this patent is extended or adjusted under 35 U.S.C. 154(b) by 247 days.

(21) Appl. No.: 13/503,399

(22) PCT Filed: Oct. 22, 2009

(86) PCT No.: PCT/EP2009/063939
§ 371 (c)(1),
(2), (4) Date: Jul. 16, 2012

(87) PCT Pub. No.: WO2011/047730
PCT Pub. Date: Apr. 28, 2011

(65) Prior Publication Data
US 2012/0271540 A1    Oct. 25, 2012

(51) Int. Cl.
*G01C 21/30* (2006.01)
*G01S 13/93* (2006.01)
*G01S 13/86* (2006.01)
*G01C 21/00* (2006.01)
*G01S 19/48* (2010.01)

(52) U.S. Cl.
CPC .............. *G01C 21/30* (2013.01); *G01S 13/931* (2013.01); *G01S 19/48* (2013.01); *G01S 13/865* (2013.01); *G01S 13/867* (2013.01); *G01S 2013/9339* (2013.01); *G01S 2013/936* (2013.01)

(58) Field of Classification Search
CPC .... G01C 21/32; G01C 21/3682; G01C 21/20; G09B 29/106
See application file for complete search history.

(56) References Cited

U.S. PATENT DOCUMENTS

| | | | |
|---|---|---|---|
| 4,494,200 A * | 1/1985 | Lam | 701/521 |
| 6,772,062 B2 * | 8/2004 | Lasky et al. | 701/518 |
| 2003/0046021 A1 * | 3/2003 | Lasky et al. | 702/150 |
| 2007/0021915 A1 | 1/2007 | Breed et al. | |
| 2010/0104199 A1 * | 4/2010 | Zhang et al. | 382/199 |
| 2010/0191421 A1 * | 7/2010 | Nilsson | 701/41 |
| 2010/0253540 A1 * | 10/2010 | Seder et al. | 340/905 |

FOREIGN PATENT DOCUMENTS

| | | |
|---|---|---|
| WO | 2008118578 A2 | 10/2008 |
| WO | 2009098154 A1 | 8/2009 |

OTHER PUBLICATIONS

NPL—Cartesian Coordinate, Date: N/A.*
International Search Report issued Jul. 2, 2010 for International Application No. PCT/EP2009/063939.

* cited by examiner

*Primary Examiner* — Ian Jen

(57) ABSTRACT

A navigation system for use in a vehicle (402). The system includes an absolute position sensor, such as GPS, in addition to one or more additional sensors, such as a camera, laser scanner, or radar. The system further comprises a digital map or database that includes records for at least some of the vehicle's surrounding objects (400). These records can include relative positional attributes with respect to a reference axis (404). As the vehicle (402) moves, sensors sense the presence of at least some of these objects (400), and measure the vehicle's relative position to those objects. This information is used to determine the vehicle's instantaneous lateral offset (428) relative to the reference axis (404), and support features such as enhanced driving directions, collision avoidance, or automatic assisted driving. The system also allows new objects (408, 414) to be attributed using relative positioning, and thereby factored into the enhanced navigation features.

18 Claims, 16 Drawing Sheets

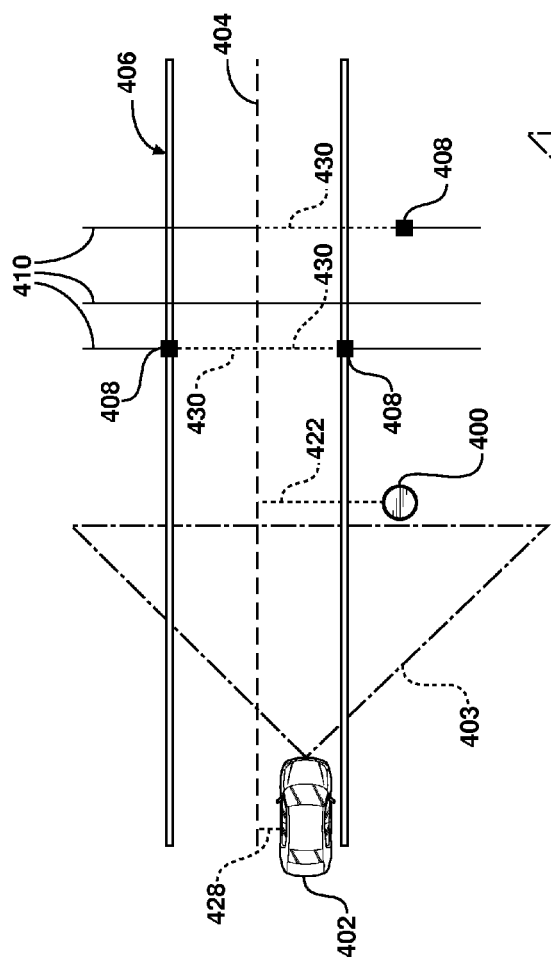

SYSTEM AND METHOD FOR VEHICLE NAVIGATION USING LATERAL OFFSETS

CROSS-REFERENCES TO RELATED APPLICATIONS

This application is the National Stage of International Application No. PCT/EP2009/063939, filed Oct. 22, 2009 and designating the United States. The entire content of this application is incorporated herein by reference.

CLAIM OF PRIORITY

None.

FIELD OF THE INVENTION

The invention relates generally to digital maps, geographical positioning systems, and vehicle navigation, and particularly to a system and method for vehicle navigation and piloting using absolute and relative coordinates.

BACKGROUND

Navigation systems, electronic maps (also referred to herein as digital maps), and geographical positioning devices have been increasingly used in vehicles to assist the driver with various navigation functions, such as: determining the overall position and orientation of the vehicle; finding destinations and addresses; calculating optimal routes (perhaps with the assistance of real time traffic information); and providing real-time driving guidance, including access to business listings or yellow pages. Typically the navigation system portrays a network of streets as a series of line segments, including a centreline running approximately along the centre of each roadway. The moving vehicle can then be generally located on the map close to or co-located with regard to that centreline.

Some early vehicle navigation systems relied primarily on relative-position determination sensors, together with a "dead-reckoning" feature, to estimate the current location and heading of the vehicle. This technique is prone to accumulating small amounts of positional error, which can be partially corrected with "map matching" algorithms. The map matching algorithm compares the dead-reckoned position calculated by the vehicle's computer with a digital map of street centrelines, to find the most appropriate point on the street network of the map, if such a point can indeed be found. The system then updates the vehicle's dead-reckoned position to match the presumably more accurate "updated position" on the map.

With the introduction of reasonably-priced Geographical Positioning System (GPS) satellite receiver hardware, a GPS receiver or GPS unit can be added to the navigation system to receive a satellite signal and to use that signal to directly compute the absolute position of the vehicle. However, map matching is still typically used to eliminate errors within the GPS system and within the map, and to more accurately show the driver where he/she is on (or relative to) that map. Even though on a global or macro-scale, satellite technology is extremely accurate; on a local or micro-scale small positional errors still do exist. This is primarily because the GPS receiver can experience an intermittent or poor signal reception or signal multipath, and also because both the centreline representation of the streets and the actual position of the GPS system may only be accurate to within several meters. Higher performing systems use a combination of dead-reckoning (DR)/inertial navigation systems (INS) and GPS to reduce position determination errors, but even with this combination errors can still occur at levels of several meters or more. Inertial sensors can provide a benefit over moderate distances, but over larger distances even systems with inertial sensors accumulate error.

While vehicle navigation devices have gradually improved over time, becoming more accurate, feature-rich, cheaper, and popular; they still fall behind the increasing demands of the automobile industry. In particular, it is expected that future vehicle navigation applications will require higher positional accuracy, and even more detailed, accurate, and feature-rich maps. Possible enhanced applications are likely to include: Adding more precise navigation guidance features to vehicles, that can be supported by improved mapping capabilities, and provide better usability and convenience for the driver; and Adding various safety applications, such as collision avoidance, which may, in turn, depend on having accurate knowledge of the position and heading of the vehicle relative to other nearby moving and stationary objects, including other vehicles. Within this context, the accuracy within the current generation of consumer navigation systems, on the order of 5 to 10 meters, was thought to be inadequate. It was believed that systems many times more accurate were needed. In order to meet these future needs, the automobile industry sought ways to improve both the accuracy of digital maps and the accuracy of on-board position determination (e.g. GPS, etc.) sensors.

At the same time, the digital mapping industry, represented by companies such as Tele Atlas, is putting greater amounts of information into its digital maps. This increased information is being combined with much higher accuracy so as to better support advanced future applications. Examples of the features now included in digital maps include: the accurate representation of the number of lanes within a particular street or road; the positions of those lanes and barriers; the identification and location of objects such as street signs and buildings footprints; and the inclusion of objects within a rich three-dimensional (3D) representation that portrays actual building facades and other features.

Current navigation systems have sufficient accuracy and map detail to allow the onboard position determination to match the vehicle's position to the appropriate street centreline, and thereby show the vehicle on the proper place in relation to a centreline map. From there the system can help the driver with orientation, routing and guidance functions. However, this level of precision is insufficient both in detail and in accuracy to tell the driver what driving lane he/she may be in (and thereby give more detailed driving guidance), or to warn the driver that he/she may be in danger of a collision. In fact, in today's mapping systems the majority of non-highway roads are depicted on the map with a single centreline which is used for vehicles traveling in both directions. Using contemporary map matching techniques, the vehicles appear to be traveling along the same line, and thus if viewed in relation to each other would always appear to be in danger of collision. Alternatively, for those digital maps in which roads are represented on the map by a centre line in each direction, the cars traveling in each direction would match to the appropriately oriented element of that road segment pair, and the cars, if viewed in relation to each other, would never appear to be in a position to collide, even if in reality the situation was quite different.

United States Publication No. 2008/0243378 proposes the addition of attribute data on map database objects that include relative position coordinates having high relative accuracy with respect to objects within its vicinity and the addition of sensor systems in the vehicle that can detect objects within its vicinity. Embodiments of that invention were designed to meet the perceived advanced needs which the automobile industry is striving for, including much higher positional accuracies both for on-board position determination equipment and for the digital map. For example, to know which lane a vehicle is moving within requires a combined error budget of no more than 1 to 2 meters. Applications that use object avoidance (for example, to prevent collision with an oncoming car straying outside its lane), may require a combined error budget of less than 1 meter. Achieving this requires even smaller error tolerances in both the vehicle position determination, and in the map. The system is designed to use nominal absolute accuracies, in combination with higher relative accuracies, to achieve overall better accuracies, and to do so in an efficient manner. An object's position, with its higher relative accuracy, need only be loosely coupled to that same object's absolute position with its lower accuracy.

FIGS. 1-10 are taken directly from US 2008/0243378 and provide a context for the present invention. FIG. 1 shows an environment 102 that uses vehicle navigation combining both absolute and relative coordinates. A typical street scene together with cars, lanes, road signs, objects and buildings, can be stored in a digital map, or map database, together with each of the stationary objects included as records in that database. Labels I, J, K and L identify individual painted lines and other objects that might be found on the street. The solid line labeled P represents the single centreline representation of the road. It will be noted that centreline P is a non-physical feature, and there may or may not be an actual painted stripe marking this center. Lines J and K are very close together, and represent the typical double-yellow marking or lines found in the middle of a bi-directional road. Lines I and L represent lane dividers, while lines H and M represent the street curbs. Labels E, F, G, N and O represent buildings. Labels A, B, C, and D represent street signs or notices, such as speed signs, stop signs, and street name signs. A first vehicle (i.e. a car) 104 is shown traveling on the street toward the top of the page, e.g., northbound, while a second vehicle (i.e. another car) 106 travels toward the bottom of the page, e.g., southbound. Each vehicle 104, 106 in this example includes a navigation device, which in turn includes an absolute location determination device such as a GPS receiver to determine (initial) absolute position. The navigation device may include inertial or dead reckoning sensors to be used in conjunction with the GPS device, to improve this estimated position, and to continue providing good estimates of position even when the GPS unit momentarily loses satellite reception. The navigation device in each vehicle 104, 106 can also include a map database and a map matching algorithm.

The vehicles 104, 106 contain one or more additional sensor(s), such as a camera, laser scanner, or radar, which assist in determining a more accurate position. The navigation system then combines information from digital map, and vehicle sensors to determine a more accurate position for the vehicle on the road. The combination of these features makes features such as navigation, and collision warning, much more useable. The navigation system in the vehicle further comprises a digital map or digital map database that includes at least some of the surrounding objects, such as the objects labeled with letters A through O. The additional sensor(s) can sense the presence of at least some of these objects A-O, and can measure its relative position (distance and bearing) to those objects. This sensor information, together with the absolute information, is then used to determine the vehicle's accurate location, and if necessary to support features such as assisted driving or collision avoidance.

Depending upon the accuracy of the sensor, it is easy to identify, for example, a road sign and estimate its relative position to an accuracy of just a few centimeters relative to the vehicle's position (which may have an estimated absolute positional accuracy of a few meters). With current mapping accuracies, the same sign can be attributed in the database with a position having an absolute accuracy also on the order of a few meters. Thus the map matching problem becomes one of unambiguously identifying the object in the database with the appropriate characteristics within a search radius of, for example, 10 meters around the vehicle.

In an example where two vehicles 104, 106 are within sensor range of the same object, the sensors on board each vehicle may not have a sufficient range or sensitivity to detect the other vehicle directly. Perhaps there are obstructions such as a hill blocking direct sensor detection. However each sensor in a vehicle can detect a common object, such as the sign A in FIG. 1. Each vehicle can use "object-based map matching" to match to the sign A using the nominal accuracies of today's absolute position determinations both on board the vehicle and within the map. Unlike the typical "map matching" feature mentioned above as part of older navigation systems, which matches the estimated position of the vehicle against road centrelines contained in the map, object-based map matching matches the estimated position and characteristics of physical objects sensed by the vehicle against one or more physical objects and their characteristics represented in the map to unambiguously match to the same object. Coupled with its heading estimate, each vehicle 104, 106 then can compute a more accurate relative position (within centimeters) with respect to sign A. This information is then used, perhaps along with other information such as its velocity, to compute trajectories with sufficient accuracy to estimate a possible collision. In a system with communication means between the vehicles 104, 106, communication of a common map object identification and relative position and heading referenced from this common map object provides the accuracy necessary to allow for reliable detection of possible collisions with adequately small false alarms. All that is needed is a common map object identification scheme and a common local relative coordinate system. The common object identification can be further insured by installing radio frequency identification (RFID) tags, or similar tags, on objects, as has been widely proposed. Each vehicle can then sense the RFID tag on the object, and can use this identifier as a further means to minimize the error involved in identifying a common object.

In the most general case, vehicles 104, 106 are beyond the sensor range of a common reference object. In these situations, the sensors on board the two vehicles may not be able to detect the other vehicle, or a common object, but may still be able to detect objects in their immediate vicinity. For example, there may be no convenient common object such as the sign A. Instead, vehicle 104 may only be able to detect signs B and C; and vehicle 106 may only be able to detect sign D. Even so, vehicle 104 can obtain a very accurate relative position and heading based on its relative sensor measurements from objects B and C. Similarly, vehicle 106 can obtain a very accurate relative position and heading from its measurements of object D and its heading estimate. Because B and C and D all have accurate relative positions to each other as stored in the map databases, these accurate relative positions can then be used by the vehicles for improved driving, route guidance, and collision avoidance. As long as the vehicles 104, 106 use the same standard relative coordinate system they can communicate accurate position, heading and speed information to each other for calculating trajectories and possible collisions.

Objects in the digital map, for example the signs B, C and D, have an accurate relative measurement to one another. This can be facilitated by placing them accurately on a common relative coordinate system (i.e. by giving them relative coordinates from a common system), and then storing information about those coordinates in the digital map for subsequent retrieval by a vehicle with such a map and system while the system is moving. In this example, vehicle 104 can then determine its position and heading accurately on this relative coordinate system; while vehicle 106 can do the same. When a communication means is included in the navigation system, the vehicles can exchange data and can accurately determine if there is a likelihood of collision. Alternatively, the data can be fed to a centralized or distributed off-board processor for computations and the results then sent down to the vehicle or used to adjust infrastructure such as vehicle speed limits, or warning lights or stop lights.

FIG. 2 shows a navigation system 130 for vehicle navigation using absolute and relative coordinates. The navigation system 130 can be placed in a vehicle, such as a car, truck, bus, or any other moving vehicle. Alternative embodiments can be similarly designed for use in shipping, aviation, handheld navigation devices, and other activities and uses. The navigation system 130 comprises a digital map or map database 134, which in turn includes a plurality of object information 136. Some or all of the object records includes information about the absolute and the relative position of the object (or raw sensor samples from objects). The navigation system 130 further comprises a positioning sensor subsystem 140, which includes a mix of one or more absolute positioning logics 142 and relative positioning logics 144. The absolute positioning logic obtains data from absolute positioning sensors 146, including or example GPS or Galileo receivers. This data can be used to obtain an initial estimate as to the absolute position of the vehicle. The relative positioning logic obtains data from relative positioning sensors 148, including for example radar, laser, optical (visible), RFID, or radio sensors 150. This data can be used to obtain an estimate as to the relative position or bearing of the vehicle compared to an object. The object may be known to the system (in which case the digital map will include a record for that object), or unknown (in which case the digital map will not include a record).

A navigation logic 160 includes a number of additional, optional components. An object selector 162 can be included to select or to match which objects are to be retrieved from the digital map or map database and used to calculate a relative position for the vehicle. A focus generator 164 can be included to determine a search area or region around the vehicle centered approximately on the initial absolute position. During use, an object-based map match is performed to identify the appropriate object or objects within that search area, and the information about those objects can then be retrieved from the digital map. As described above, a communications logic 166 can be included to communicate information from the navigation system in one vehicle to that of another vehicle directly or via some form of supporting infrastructure. An object-based map matching logic 168 can be included to match sensor detected objects and their attributes, to known map features (and their attributes), such as street signs, and other known reference points. Conversely, objects may be a set of raw samples that are matched directly with corresponding raw samples stored in the map. A vehicle position determination logic 170 receives input from each of the sensors, and other components, to calculate an accurate position (and bearing if desired) for the vehicle, relative to the digital map, other vehicles, and other objects. A vehicle feedback interface 174 receives the information about the position of the vehicle. The information can be used for driver feedback 180 (in which case it can also be fed to a driver's navigation display 178). This information can include position feedback, detailed route guidance, and collision warnings. The information can also be used for automatic vehicle feedback 182, such as brake control, and automatic vehicle collision avoidance.

FIG. 3 shows a digital map 134, or a database of map information, including absolute and relative coordinates. The digital map 134 or database comprises a plurality of object information, corresponding to a plurality of objects in the real world that may be represented on a map. Some objects, such as the unpainted centreline of a road as described above, may not be real in the sense they are physical, but nevertheless they can still be represented as objects in the digital map 134. Some (or all) of the plurality of objects 200 include one of absolute 202 and/or relative 204 coordinates. In any digital map 134, some of the map objects may not have an actual physical location, and are only stored in the digital map by virtue of being associated with another (physical) object. Furthermore the map 134 can include many non-navigation attributes. Of more importance to the present context are those map objects that do indeed have a known physical location, and which can be used for relative position functions. These objects, such as Object A, have both an absolute coordinate, and a relative coordinate. The absolute coordinate can comprise any absolute coordinate system, such as simple latitude-longitude (lat-long), and provides an absolute location of the object. The absolute coordinate can have additional information associated therewith, including for example, the object's attributes, or other properties. The relative coordinate can comprise any relative coordinate system, such as Cartesian (x,y,z), or polar coordinates, and provides a relative location of the object. The relative coordinate can also have additional information associated therewith, including for example, the accuracy associated with that object record, or the last date the record was updated. The relative coordinate also includes an accurate relative position of the object to another object or to an arbitrary origin. It is convenient to express the relative coordinates in terms of an arbitrary origin because all of the relative positions can then be measured by taking the difference of one coordinate set from another and in that process, the arbitrary origin cancels out. The relative coordinate for a particular object can indicate multiple relative position information to represent how the object may be seen using multiple different types of sensors, or using different relative coordinate systems.

Each additional object 210 in the digital map 134 can have the same type of data stored therewith. Some objects (for example a building, minor signs) may not have the same benefit with regard to relative positioning, and may include only absolute positioning coordinates, whereas more important objects (such as street corners, major signs), that are relative-position enabled, should include both absolute positioning and relative positioning coordinates. Some larger objects may have more information describing particular aspects of the object (e.g. the north-west edge of a building), that in turn provides the appropriate precision and accuracy.

As described above, a linkage is provided between the absolute location or coordinates of an object in an absolute coordinate system and the relative location or coordinates of the same object in a relative coordinate system, by virtue of a common object identifier (ID), such as a ULRO. In this manner there is no need for a tight mathematical linkage between the two coordinate systems. Indeed such a linkage could reduce the benefits of the system because the relative coordinates will be very accurate with respect to objects nearby, but may accumulate random errors when measured relative to objects further away. This will have the effect that if one arbitrarily equated the relative position at a point to its absolute position then at large inter-object distance (say more than 10 kilometers away) the relative position would appear to have large errors in comparison with its absolute coordinates.

FIG. 4 shows a method for navigating using absolute and relative coordinates. In a first step 230, the vehicle navigation system determines an (initial) absolute position for the vehicle, using GPS, Galileo, or a similar absolute positioning receiver or system. This initial step may also optionally include combining or using information from INS or DR sensors. In the following step 232, the system uses on-board vehicle sensors to find the location of, and bearing to, surrounding objects. In step 234, the system then uses its knowledge of the vehicle's current absolute position to access objects in the digital map (or map database) that are within an appropriate search area, based on the estimate of the absolute accuracy of the vehicle and the map. The search area can be centered on the estimated current position of the vehicle, or centered on an actual or estimated position of one of the objects, or on an estimated look-ahead position reading from the sensors. Using the relative positions of the sensed objects, (together with optionally one or more of their measured characteristics, e.g. size, height, color, shape, categorization etc), the system, in steps 236 and 238, uses object-based map matching ("object matches") to uniquely identify the sensed objects and extract relevant object information. In step 240, the relevant object information, and the relative positions of those objects, (together with optional heading information), allows the vehicle navigation system to calculate an accurate relative position for the vehicle within a relative coordinate space, or relative coordinate system. In step 242, this accurate position is then used by the system to place the vehicle in a more accurate position relative to nearby objects, and alternatively to provide necessary feedback about the position to the driver, or to the vehicle itself, including where necessary providing assisted piloting, collision avoidance warning, or other assistance. The absolute position information and the relative position information can also be combined to calculate an accurate absolute position for the vehicle. This accurate position can again be used by the system to place the vehicle in a more accurate position within a relative coordinate system, provide feedback about the position to the driver, or to the vehicle itself, including collision avoidance warning, piloting or other assistance. A more accurate absolute position can also be used to reduce the search area size for subsequent object-based map matching.

FIG. 5 shows an alternative method for navigating using absolute and relative coordinates. In a first step 260, the vehicle navigation system determines an (initial) absolute position for the vehicle, using GPS, Galileo, or a similar absolute positioning receiver or system. In step 262, the system then uses a focus generator to determine a search area around this initial position. As with the above example, depending on the particular implementation the search area can be centered on the estimated current position of the vehicle, or on an actual or estimated position of one of the objects, or using some alternative means. In the following step 264, the system uses the digital map (or map database) to extract object information for those objects in the search area. The system then, in step 266, uses its on-board vehicle sensors to find the location of, and bearing to, those objects. Using the relative positions of the sensed objects, (together with optionally one or more of their measured characteristics, e.g. size, height, color, shape, categorization etc), the system, in step 268, uses object-based map matching to match the sensed information with the objects in the search area. In step 270, the relevant object information, and the relative positions of those objects, allows the vehicle navigation system to calculate an accurate relative position for the vehicle within a relative coordinate space, or relative coordinate system. As with the previous technique, this accurate position is then used by the system, in step 272, to place the vehicle in a more accurate position within the relative coordinate system, and alternatively to provide necessary feedback about the position to the driver, or to the vehicle itself, including where necessary providing collision avoidance assistance. The system allows some objects to be attributed using relative positioning, without recourse to storing absolute position information. Using this approach, a first object may lack any stored absolute position information, whereas a second object may have absolute position information. The system computes a position for the first object that is measured relative to the second object (or using a series of relative hops through third, fourth, etc. objects). The second object must be either explicitly pointed-to by the first object, or alternatively must be found as part of the network of objects surrounding the first object. The relative position information can then be used to provide an estimate of the absolute position of the first object.

For example, the centreline of a road or roadway can be attributed with absolute coordinates. Each lane of the road can then be attributed with a relative offset coordinate to the centreline. Since in many instances the relative positions can be measured more precisely than the absolute positions, this technique can provide a reasonably accurate estimate of an object's absolute position, so long as the distance (or the number of relative hops) from the object being measured to the object with the absolute measurement is not too far that it diminishes overall accuracy. An advantage of this technique is that it requires much less data storage while still being able to provide accurate absolute object position information.

FIG. 6 is similar to FIG. 1 but shows a more-detailed illustration of an environment that uses a vehicle navigation system and method. The street scene previously shown in FIG. 1, together with cars, lanes, road signs, objects and buildings, is indicated with the same reference characters. Vehicle (e.g., a car) 104 incorporates a vehicle navigation system that determines an absolute position 294 using, for example, GPS. Sensors on the vehicle 104 determine 300, 302 distance and bearing to one or more objects, for example street signs B and C. Information is retrieved for all objects in a search area defined by the estimated accuracy of the map and the current absolute position determination. The combined information is used by the navigation system to determine an accurate position for the vehicle 104 with regard to the road, the street furniture (curbs, signs, etc.) and optionally other vehicles (when the navigation systems in those vehicles include appropriate communication means). The accurate position information can then be used for improved vehicle navigation, guidance and collision warnings and avoidance.

FIG. 7 shows another method for navigating using absolute and relative coordinates, illustrating how absolute position information and relative position information can be combined to calculate an accurate absolute position for the vehicle. This accurate position can again be used by the system to place the vehicle in a more accurate position within a relative coordinate system. A more accurate absolute position can also be used to reduce the search area size for subsequent object-based map matching. In a first step 308, the system makes a position determination using its positioning sensors (generally in terms of absolute coordinates). In step 310, the vehicle then uses its object detection sensors to detect, characterize, and measure the relative position of objects that it "sees". In the next step 312, the system uses map-object-matching algorithms to explore the objects in the map database in the search area or region centered on the estimated absolute coordinates of the computed object location (or on the relative coordinates if it had synchronized with the relative coordinates of the map database at some relatively nearby position). The search region size is roughly proportional to the combined error estimates of the absolute coordinates of the map objects and the vehicle's position determination (or the combined error estimates of the relative coordinates of the map objects and the vehicles relative position determination). Using this technique, the relative accuracy is more accurate nearer to an object, and is less accurate further away from the object. For example, if the last time that the vehicle had synced with objects was 50 miles ago, then using relative positions to ascertain the vehicle position would probably not be satisfactory. However, under normal driving circumstances, a driver would be driving in a relatively rich environment of objects and their vehicle would "see" objects almost continuously, or every few meters. In this environment and under these conditions, the relative positions can be made very accurate, even more so than the absolute accuracies. In step 314, using its matching algorithms, including other characterizing information from the sensor and the map database, the system can then uniquely identify the object or objects "seen". In step 316, using the relative measurements from the map database and if needed the navigation system's own DR or INS heading estimate, the vehicle can determine its accurate relative coordinates. For example, if only one object is matched, and if the vehicle has a measurement of distance to the object and a relative bearing, then the navigation system can only define its location along a locus of points that is a circle, with the object at the centre of the circle and a radius equal to the distance measured. In theory, a vehicle can travel along that radius while keeping the same bearing to the object; thus with distance and bearing alone one cannot uniquely determine the exact point along that locus that pinpoints the vehicle. In these situations, the estimated heading of the vehicle can be used in combination with the relative measurements. Since there is only one point on the locus of points where the vehicle has that heading, a unique point can be determined. Generally, heading estimates are not the most accurate so this technique could add a certain amount of inaccuracy in the relative position. To address this, two or more objects can be sensed simultaneously or in very close sequence (i.e. within a distance that the vehicles heading relative heading has not accumulated much error). A circle (locus of points) can be drawn from both objects with appropriate radii, and the bearings to the two objects used to determine which of the two points is physically the correct point. Thus a more accurate relative position can be calculated for the vehicle.

The vehicle can, in step 322, use its relative coordinates to communicate with other vehicles in the area, or compute more accurate guidance directions or utilize the object information. The results of the preceding steps can then be repeated as necessary (indicated by step 320) to improve the position estimate and continuously iterate on subsequent sensor detected objects, reducing the search region in proportion to the improved accuracy based on this process. At intervals between sensor-detected objects the vehicle can, in step 324, use its internal position update process to update its position and heading and update an estimate of the positional accuracies accordingly. If the vehicle travels too far without such updates, its relative accuracy will deteriorate, and it will again need to rely on its absolute positioning to start the sequence all over again.

Additional highly accurate absolute position measurements can be made throughout an area. The relative positions of objects can be collected as described. Then a process can be conducted to "rubber sheet" all points according to error minimizing schemes which are well known by those skilled in the art. Those points falling outside accuracy specifications can be reviewed and the process reiterated as needed. This can eliminate the need of carrying two sets of coordinates (one absolute and another relative) but it adds extra work and extra costs.

The type of map matching described above with respect to embodiments of US 2008/0243378 is inherently different from and more accurate than traditional map matching techniques. In the case of traditional map matching, such as used with dead-reckoning, the sensors on board the vehicle only estimate the vehicle position and heading, and have no direct sensor measurement of the existence or position of any object such as a road or a physical object alongside the road. Also, with traditional map matching the map is a simplified representation of the road, only containing the theoretical concept of the "center" of the road, so the map matching is performed on an inference basis. I.e., the algorithms infer that the car is likely on the road and can then be approximated as being on the centreline of the road. In contrast, in the object-based map matching taught in US 2008/0243378, a sensor detects the existence of one or more objects and possibly additional identifying characteristics (such as color or size or shape or height of a sign, or receives some information about the RFID associated with the object) and also measures its position and uses this information to match to objects of similar characteristics and location in the map database. Additionally, unlike traditional map matching which matches a vehicle to a two dimensional road and thus only has enough information to improve the accuracy in one degree of freedom, the map matching of US 2008/0243378 can also be used with point objects, and therefore has the ability to improve the accuracy in two degrees of freedom. Thus the sensor-detected object matching can be more accurate and more robust than previous forms of map matching.

As with any map matching technique the risk of error still exists, namely the possibility of matching to the wrong object in the database. If the sensor senses one or more road signs in an area of many road signs, there exists a possibility that the object-based map matching algorithm will match to the wrong sign and hence introduce an error to the estimated relative position of the vehicle. However, measures can be introduced to reduce that risk. Firstly, the risk of error is greatly reduced by the fact that the sensor is sensing a real object and hence object-based matching does not simply need to infer the existence of an object. Secondly, the objects have distinguishing characteristics. Thirdly, map vendors can collect a generally high density of objects with different characteristics so that multi-object map matching or rapid sequential object-based map matching can be used to clarify the situation. Filtering means based on many detected and matched objects can also be used to limit the potential influence of any single error. Fifthly, once an initial object match has been performed using the absolute positional information of the navigation device, the device can compute a relative estimate of position and use that to improve the centre of the search area and further limit the size of the search area. From this point forward, the map matching can be done based on relative accuracies and the search areas can be dramatically reduced, making the possibility of erroneous matches diminishingly small. This sequential process remains good as long as object-based matches continue to eliminate the accumulation of error that will naturally occur when using the systems INS or DR sensors.

FIGS. 8-10 show an environment in which vehicle navigation is used to discern lane positioning. In FIG. 8, a car 330 is traveling northbound (for example) and approaching an intersection 332. The vehicle's navigation system has computed a path (not shown) to its destination that suggests making a left turn at the intersection 332. This same intersection 332 is shown in FIG. 9, which depicts the way in which a traditional navigation system, i.e., one which does not utilize relative position sensing for accurate position determination, would facilitate the navigation. Here, the map would likely only show a single centreline for each of the segments connected at the centre of the intersection. Thus, the guidance provided to the vehicle 330 would be a simple highlighted path 340 with a 90 degree turn at the point of intersection between the two streets. FIG. 10, however, is another view as in FIG. 8 but demonstrating how information is processed under the methods taught in US2008/0243378. The system (and thus the digital map) "knows" the lane information in much greater detail. The car is equipped with a sensor, for example a radar sensor. The radar sensor can detect 342, 344 and measure the distance and heading to some of the various objects near it, for example the traffic light posts and traffic signs and signposts labeled A, B, C, D, E, F, and G. The map in the navigation/guidance and safety system thus contains information about these objects. The digital map can include the absolute position and relative position of the objects, together with other information such as an RFID tag information if it were present, accuracy limits and type and class of object. The car can then use its absolute position estimate 336 and the relative distance and headings to these objects (and possibly previous information about its relative positions computed from previous observations of objects) to object-based map match to the group of objects that it can see. On the basis of this matching and the relative measurements, the navigation system can accurately compute its position relative to these objects contained on the map.

Once the in-car navigation system has computed its position in the relative coordinate space defined by the map, the system can then compute its position relative to the other objects contained in the map that the radar sensor could not detect. So for example, the navigation system can compute what lane the car is in, and accurately compute when it gets to the point on the road that the left turn lane begins. The system can then tell the driver that he can enter the left turn lane (perhaps confirming first by the radar measurements that the left turn lane is not occupied). In a more general setting the system can tell the driver if he/she is drifting out of their current lane. As the vehicle moves, the navigation system computes both an updated absolute position and an updated relative position 350. It can do this by recomputing its position by updating its radar measurements, or by using dead reckoning, or an update to its absolute sensor, or a combination of some or all the above to best refine its relative measurement 352, 354, 356. As it approaches the cross walk, X, it can then accurately determine how close it is to it, based on the relative measurements of the map and its updated relative position. If the car is slowing down, the navigation system can sense, for example, that the car needs to stop, and can assist the driver in coming to an accurate stop just before the crosswalk. Such a system can be used at even further distances to assist drivers in coming to fuel efficient and comfortable stops for red lights etc, especially with the added information from road infrastructure regarding traffic light timing. The system can then continue to inform the driver as to how to navigate the car through the intersection and into the appropriate westbound lane.

Other important objects than road signs and buildings exist and can be readily detected to the extent they are made part of more advanced map databases. For example, lane strips can be detected by some sensors (e.g. cameras and laser scanners). Hence an accurate position with respect to this lane object can be computed in the very important dimension associated with lane keeping. Such information is partial in nature; for example, knowing that the lane stripe is 10 centimeters from the left bumper can accurately determine one coordinate but tells little about the second (along the road) coordinate. Care must also be taken to avoid ambiguities regarding which lane is detected. Algorithms that combine such information derived from two-dimensional (2D) objects with information derived from even occasional one-dimensional (1D) objects and their own navigation system will be able to maintain their accurate relative positioning. The relative coordinate information attributed to such a 2D object is not a relative x,y position but rather an equation defining its linear characteristic in relative x,y coordinate space. Similar considerations hold true of three-dimensional (3D) objects such as buildings. In this case care should also be taken to identify more specific objects or characteristics, such as the edge of the building.

As can be appreciated from the preceding discussion, precise lane guidance was thought to require the ability to position the car on the lane with very high accuracy. The traditional approach in which the car is positioned using absolute coordinates collected from a GPS receiver alone is not cost effective in the context of high-precision positioning. The approach described above in connection with US 2008/0243378 is conceptually brilliant and highly advantageous, but presumes to accurate positioning in the x, y coordinate system is required to enable advanced navigation services like collision avoidance and lane shifting. It assumes that landmarks are grouped by means of relative precision of measurement and to each other and/or relative accuracy within a database context. Through this technique, a vehicle can establish its position very precisely to the digital database map using a map matching algorithm. This accuracy is achieved at the cost of rather intensive data processing efforts. Thus, even US 2008/0243378 could be improved with certain tools to enable a more practical and efficient implementation. Accordingly, there is a need for a practical and efficient implementation of the invention defined in US 2008/0243378.

SUMMARY OF THE INVENTION

A method for vehicle navigation according to this invention uses the vehicle's lateral offset from a common reference axis to provide enhanced driver assistance features. The method comprises steps of: providing a digital map database configured to store the absolute geographic location and relative spatial location for a plurality of objects, at least two of which comprise a longitudinally extending roadway and a marker from reality disposed adjacent to the roadway. A reference axis is associated with the roadway in the digital map database. The reference axis extends generally parallel with the roadway. As the roadway curves, the axis curves with it. An object offset measurement is stored in the digital map database. The object offset is the perpendicular distance measurement between the reference axis and the marker. A vehicle is configured to travel along the roadway. The vehicle is fitted with a navigation system enabled by at least one object sensor. The method further includes sensing the existence, identity, and relative bearing/range to the marker using the object sensor on the vehicle. An instantaneous vehicle offset is then calculated using the stored object offset and the relative bearing/range to the marker. The instantaneous vehicle offset is the perpendicular distance measurement between the reference axis and the vehicle. The instantaneous vehicle offset is computed using minimal processing resources and enables advanced driver assistance operations, as may be desired, without determining the precise x, y coordinates of the vehicle.

The invention also contemplates a system for vehicle navigation. The system comprises a digital map database containing the stored absolute geographic location and relative spatial location for a plurality of objects. The objects store in the database at least include a longitudinally extending roadway, a marker from reality disposed adjacent to the roadway, and a reference axis spatially associated with and extending generally parallel to the roadway. The digital map database further includes a stored object offset measurement associated with the marker. The object offset comprises the perpendicular distance measurement between the reference axis and the marker. At least one object sensor is provided for sensing the relative bearing/range to the marker. A portable navigation device is operatively interconnected with the object sensor and the digital map database for calculating an instantaneous vehicle offset. The instantaneous vehicle offset is calculated using the stored object offset and the sensed relative bearing/range to the marker. This instantaneous vehicle offset is easily computed using minimal processing resources and enables enhanced driver assistance operations.

This invention describes a method and apparatus for obtaining a vehicle's lateral position i.e., its perpendicular offset relative to a defined centreline, so as to enable advanced driver assistance systems, e.g. real-time lane guidance. This invention proposes that only accurate 1d (lateral) relative distance is sufficient to accomplish these objectives, thereby lowering the cost of process/storage/equipment. This invention, therefore, proposes a new solution, whereby easily recognizable physical markers that are detected by sensors provided on vehicles. These physical markers are pre-entered into a digital map database with at least one relative position measure to the reference axis having a high level of accuracy (typically +/−10-20 cm or even lower). Each marker is pre-located relative to the reference axis, which may coincide with the curvilinear road axis or centreline.

Thus, taking into account a sensor-equipped vehicle/device configured to identify a physical roadside marker and its corresponding digital representation in the map database, a far more exact lateral position of the vehicle can be determined as regards the road on which it is traveling. With this technique, the particular lane in which the vehicle is situated can be identified with a high degree of confidence.

This invention provides a cost effective method to position a vehicle laterally on a roadway with high accuracy. By determining lateral offset (relative to the reference axis) separately from absolute (i.e., GPS) position, it becomes possible to dynamically broadcast content to vehicles, allowing real time decisions on the road.

BRIEF DESCRIPTION OF THE FIGURES

These and other features and advantages of the present invention will become more readily appreciated when considered in connection with the following detailed description and appended drawings, wherein:

FIG. 11 is a simplified view of a roadway fragment as contained in the digital map database and having a previously identified marker capable of being sensed by a vehicle traveling the roadway;

FIG. 12 is a view as in FIG. 11 but depicting dynamic as well as static objects present on and around the roadway which have relevance to vehicle navigation;

DETAILED DESCRIPTION

Figure 1:
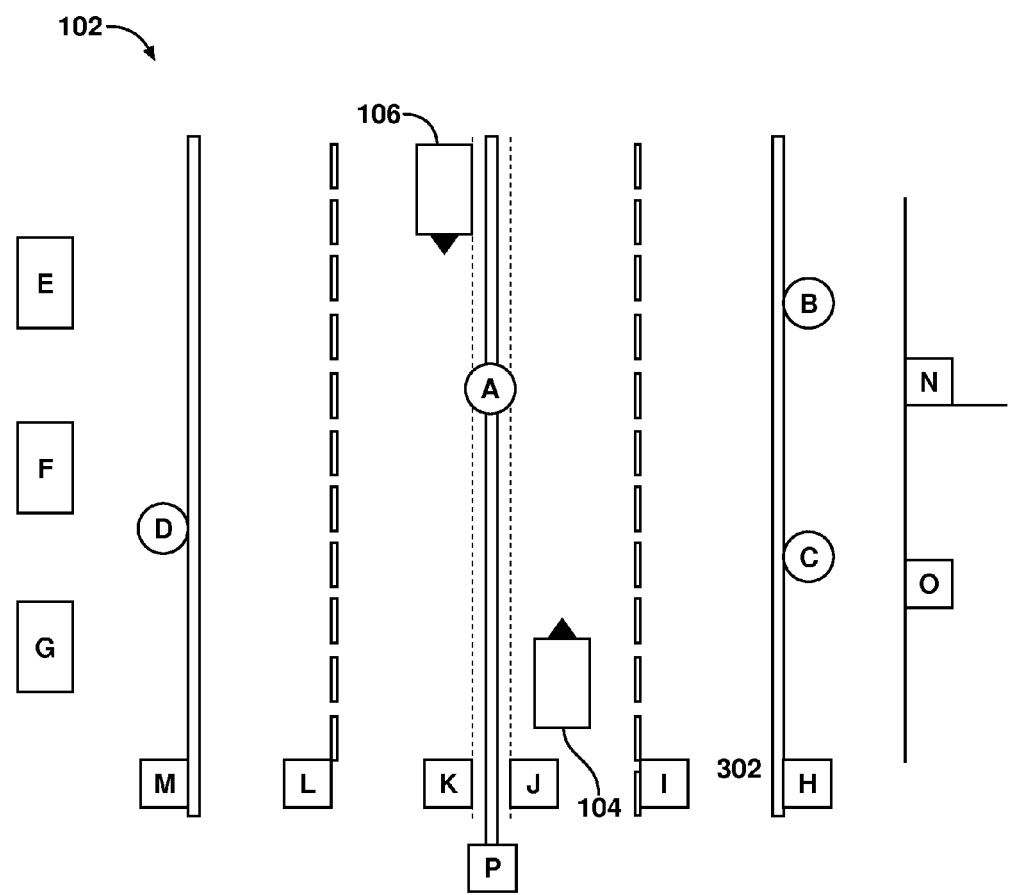
FIG. 1 shows an environment that can use vehicle navigation using absolute and relative coordinates, in accordance with an embodiment of the invention.
Figure 2:
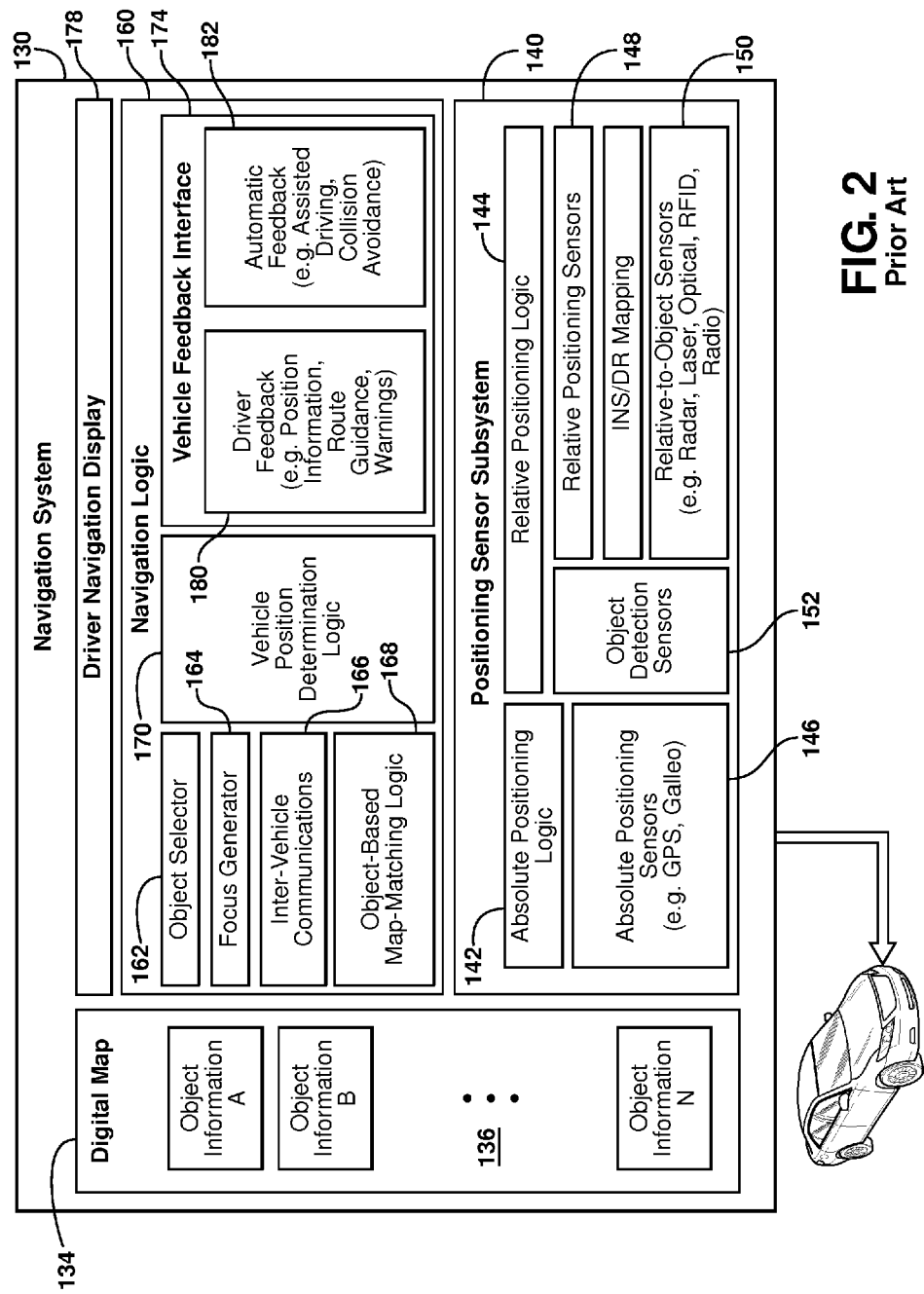
FIG. 2 shows a system for vehicle navigation using absolute and relative coordinates, in accordance with an embodiment of the invention.
Figure 3:
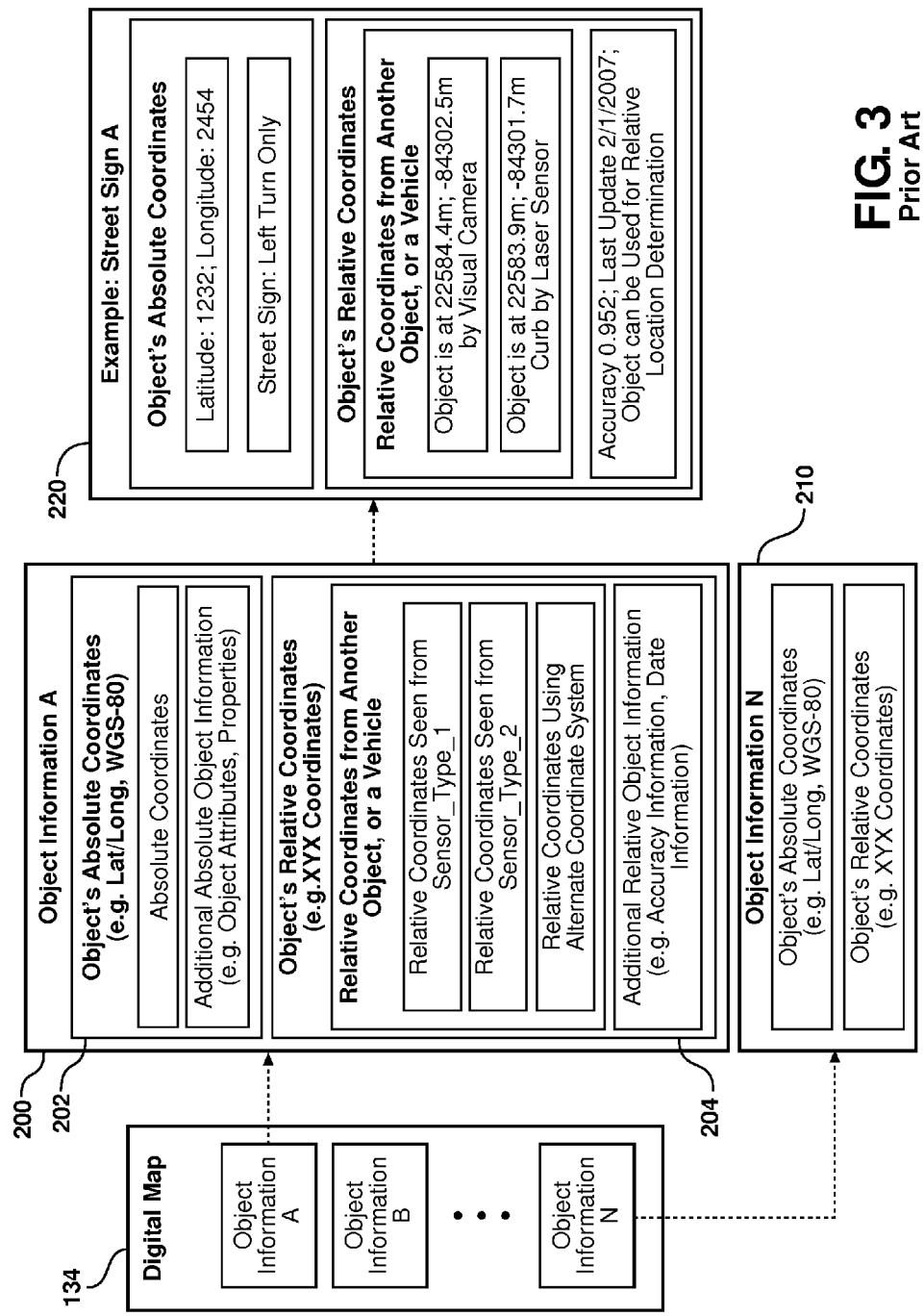
FIG. 3 shows a database of map information, including absolute and relative coordinates, in accordance with an embodiment of the invention.
Figure 4:
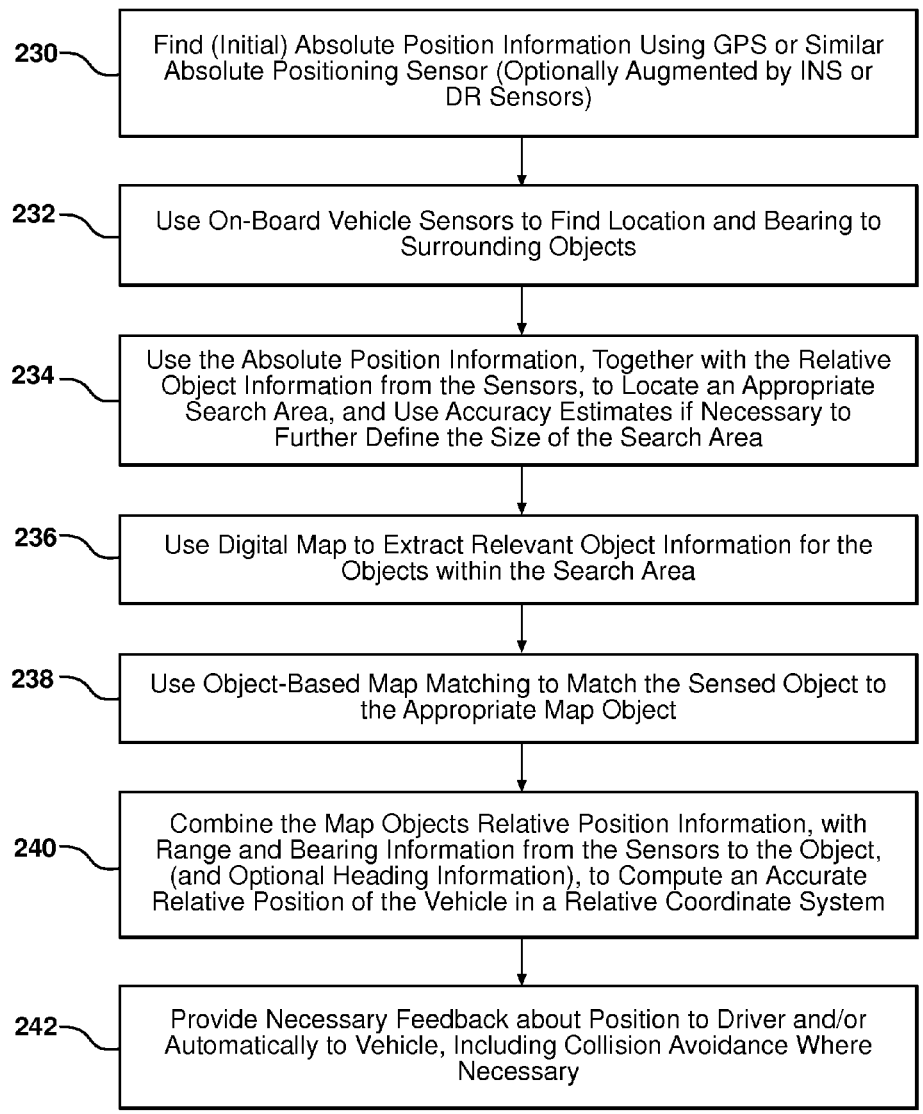
FIG. 4 shows a method for navigating using absolute and relative coordinates, in accordance with an embodiment of the invention.
Figure 5:
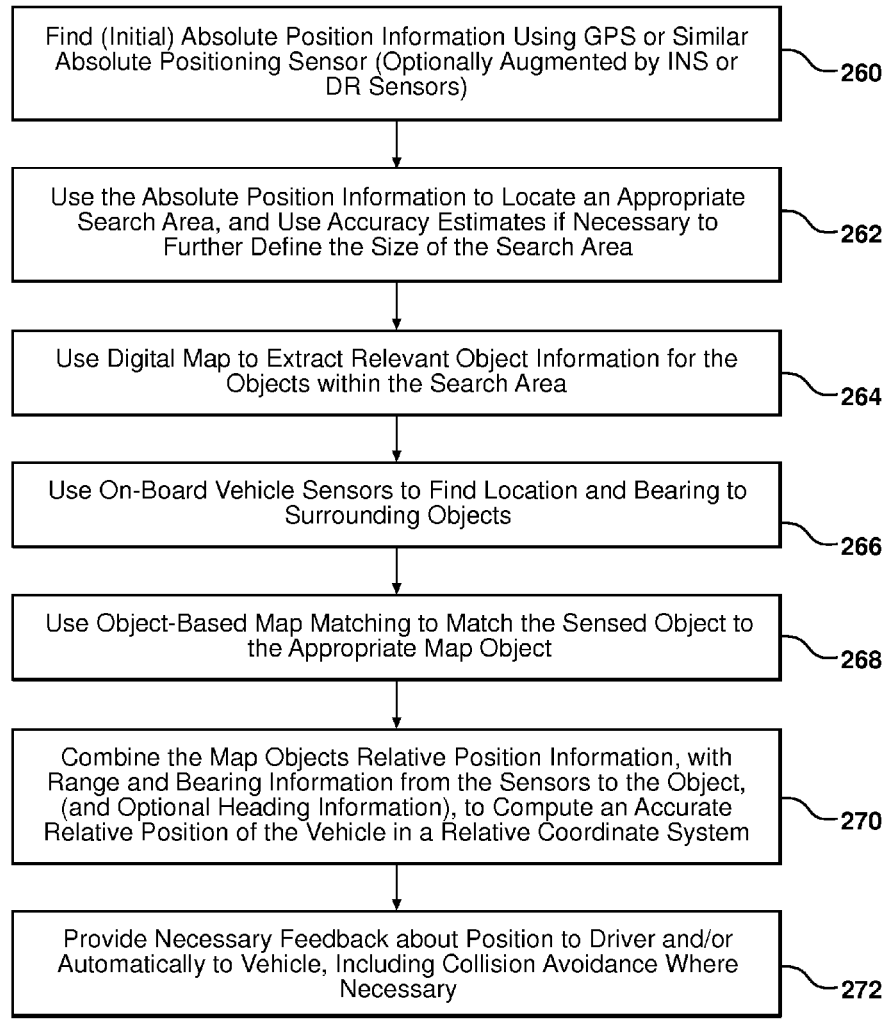
FIG. 5 shows a method for navigating using absolute and relative coordinates, in accordance with an embodiment of the invention.
Figure 6:
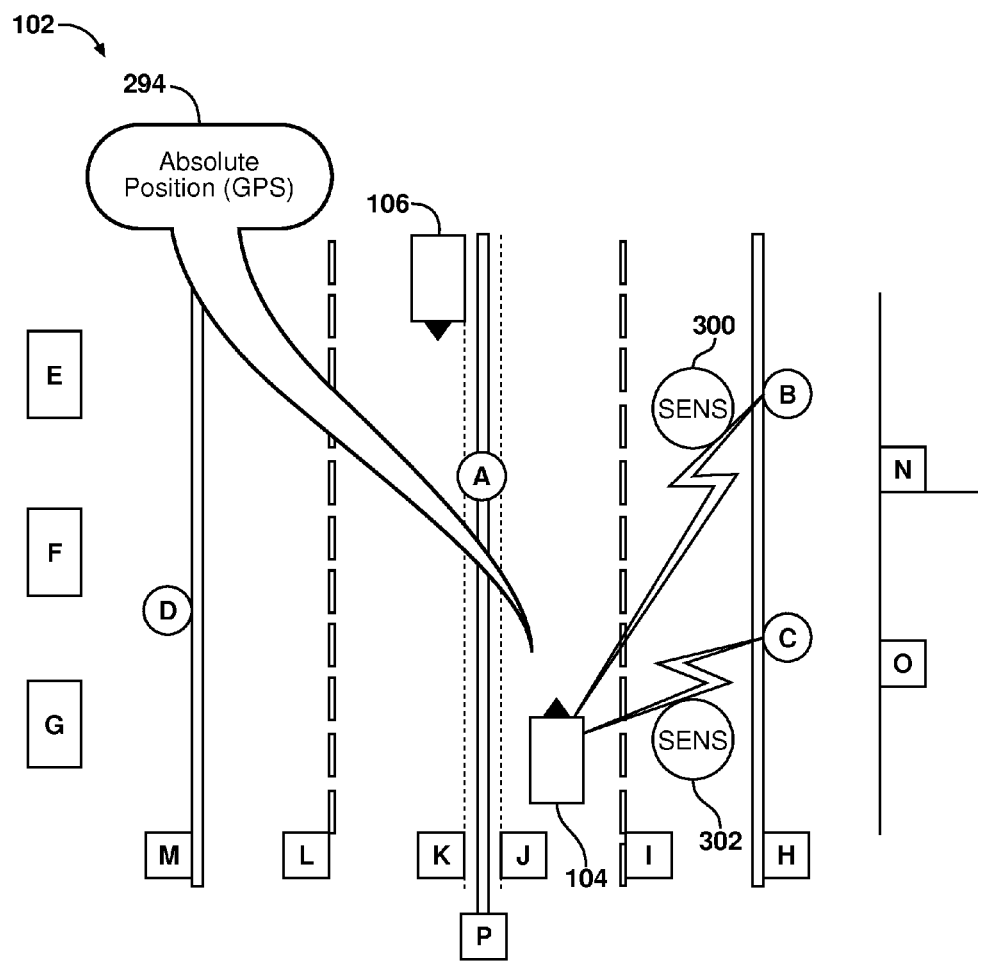
FIG. 6 shows an environment that uses a vehicle navigation system and method, in accordance with an embodiment of the invention.
Figure 7:
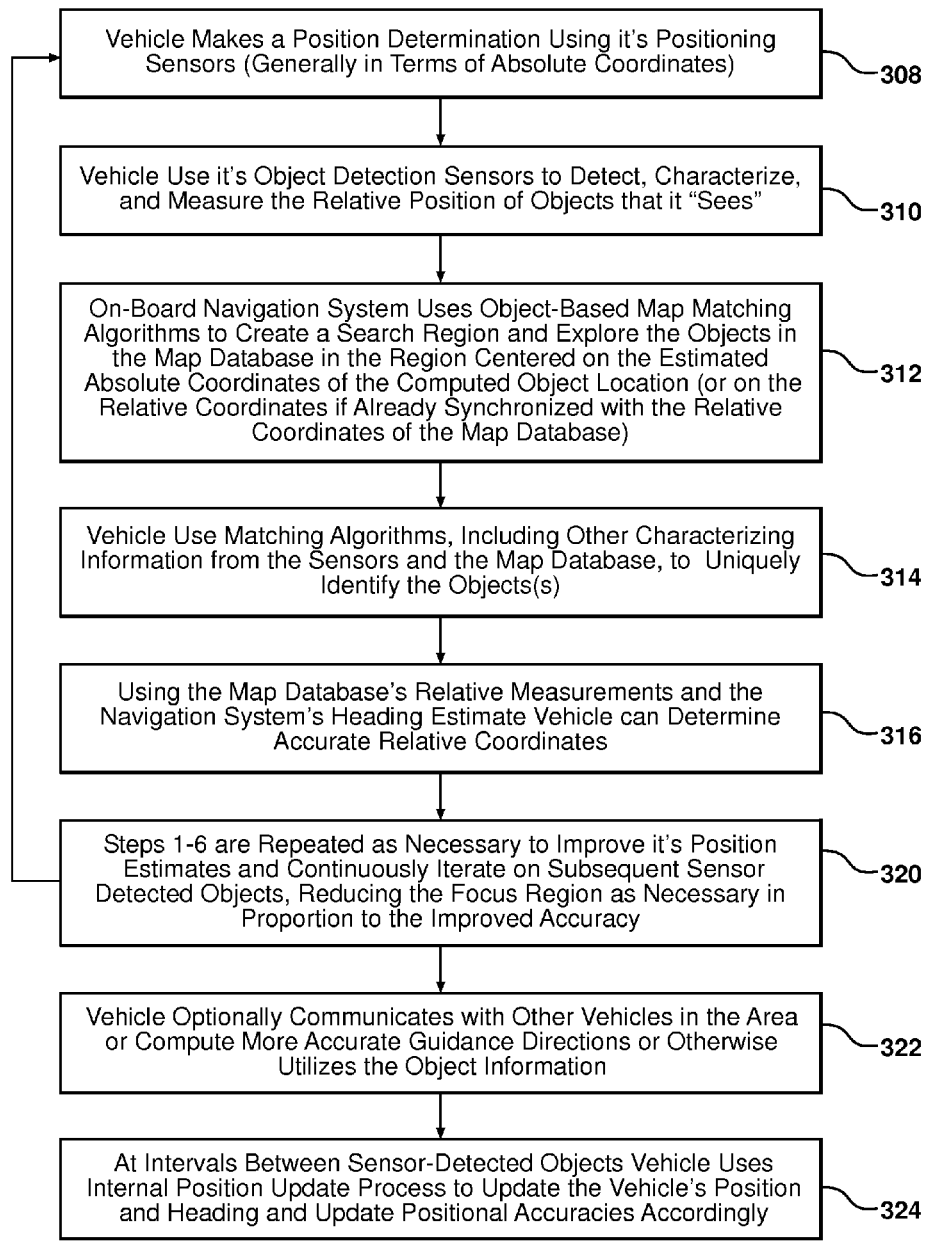
FIG. 7 shows a method for navigating using absolute and relative coordinates, in accordance with an embodiment of the invention.
Figure 8:
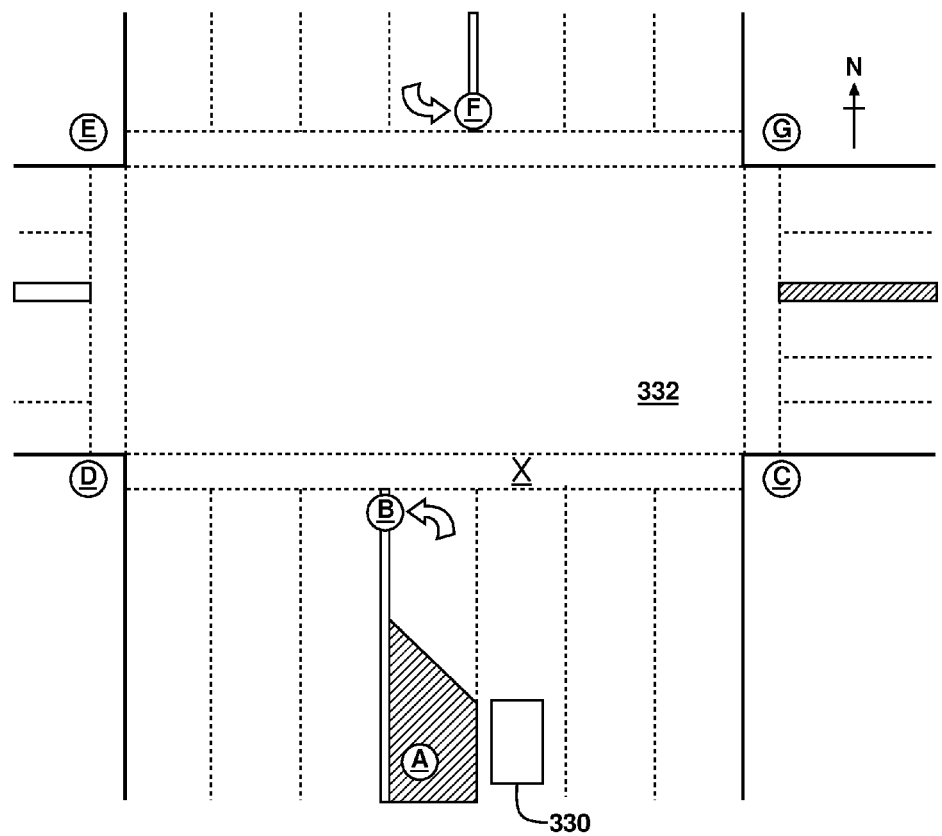
FIG. 8 shows an environment that can use vehicle navigation to discern lane positioning, in accordance with an embodiment of the invention.
Figure 9:
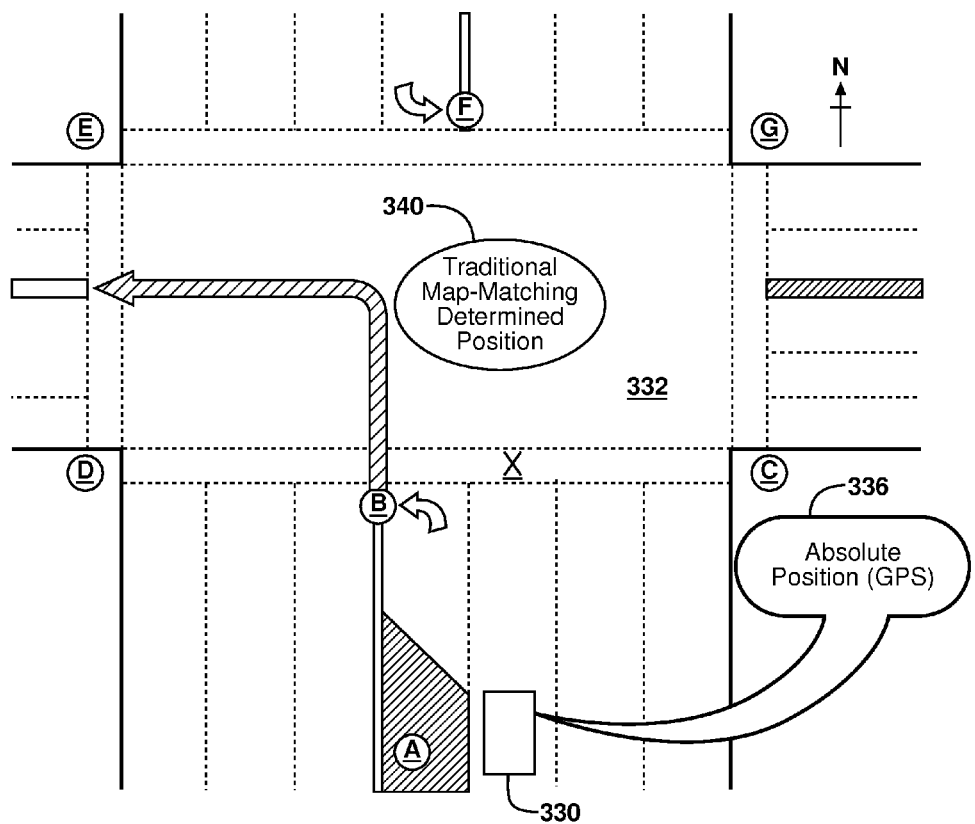
FIG. 9 shows an environment that can use vehicle navigation to discern lane positioning, in accordance with an embodiment of the invention.
Figure 10:
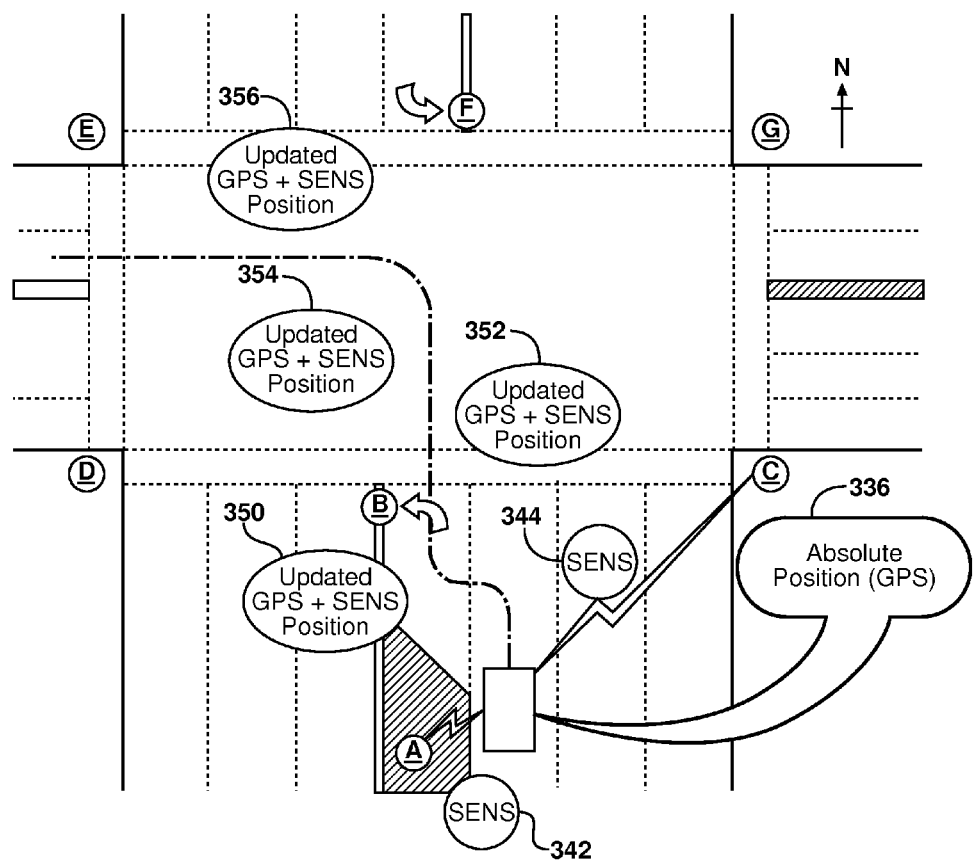
FIG. 10 shows an environment that can use vehicle navigation to discern lane positioning, in accordance with an embodiment of the invention.

This invention relates specifically to an improved method and apparatus or system for obtaining an object's position, i.e., of a vehicle on a road, with much greater accuracy than purely through GPS/A-GPS and traditional map matching techniques. The increase in accuracy is not in the physical x, y, z spatial location obtained from GPS, but results from the fact that spatial position relative to some other pre-defined/pre-located physical object can be determined with far greater accuracy than a GPS-derived surface location by means of suitable on-board sensors, like that described above in connection with US 2008/0243378. In addition to the known teachings, this invention sets forth an efficient and practical implementation method whereby only one dimension (1D-lateral) relative distance can be used to effect the advantageous attributes of this concept, thereby lowering the cost of electronic processing, storage, and related equipment requirements.

Mobile mapping vehicles, known colloquially as MoMa vans, determine their position using high accuracy GPS systems, Inertial Navigation Systems (INS) and various other technologies, and create map data, i.e. a database, by means of a number of techniques. In normal use, the reality surrounding the MoMa van is digitized, geo-coded to as great an accuracy as possible, and then formatted, compressed and/or otherwise post-processed so as to be capable for inclusion/insertion into a digital map database. A sensor arrangement in the MoMa Van enables features and objects to be identified and geo-located with centimeter precision.

This invention describes an improvement to the relative positioning techniques of US 2008/0243378 whereby easily recognizable physical markers, ideally roadside-located signage and/or utilities, are identified by mapping vehicles, and can be detected by sensors provided on normal passenger and commercial vehicles. These physical markers are entered into the database with at least one relative position measure having a high level of accuracy (typically +/−10-20 cm or even lower if required), the marker being relative to some arbitrarily chosen other feature(s) also identified in the digital map database, e.g., a reference axis which may coincide with the curvilinear road axis or centreline. As advanced driver assistance systems, e.g. real-time lane guidance (ADAS), becomes more widely accepted in vehicle navigation, the central road axis, or road centreline, will be given increased attention from the point of view of accuracy in digital databases. But in any event, it is currently identified in most commercial databases with a good degree of accuracy.

One particular advantage of this invention is the fact that only one dimensional attribute—distance to centreline—is sufficient to cover important ADAS applications such as lane departure, collision detection, etc. Current in-car and portable navigation systems are generally only capable of resolving their spatial position relatively crudely (+/−5-10 m) to determine on which road the car is traveling, and in which direction, but not which lane the vehicle is traveling. This level of resolution is insufficient for true ADAS applications. However, by also taking into account a sensor-equipped vehicle/device configured to identify a roadside physical marker and its corresponding digital representation in the map database, a far more exact position of the vehicle can be determined as regards the road on which it is traveling, both laterally and longitudinally. Accordingly, this invention teaches that only lateral position relative to the marker is sufficient to determine the particular lane in which a vehicle is situated. As soon as this can be achieved, ADAS becomes a far more realistic possibility.

Referring now to FIG. 11, a marker 400 is an object from reality that has been inserted into the database and can be recognized by sensors on a vehicle 402. (Sensor scanning range is indicated at 403.) The marker 400 can be any road sign stored and attributed in reality database relative to a curvilinear reference axis 404 with high accuracy. The curvilinear reference axis 404 (referred to as simply 'axis' later on) is parallel to the normal traffic flow along any road or roadway 406. The axis 404 can be a lane marker or centre of the lane of independent traffic, or an imaginary feature. Using existing technologies, objects of relevance can be collected from the roadway 406 and positioned relative to the axis 404 with high accuracy, thus positioning these objects 408 with high accuracy relative to a position marker 400. From such objects 408, imaginary cross-sections 410 are created perpendicular to the reference axis 404. Each cross-section 410 is relatively positioned with respect to the axis 404 with a high accuracy and to the roadway 406 with similar accuracy. Objects 408 contained in a cross-section 410 are used to represent all relevant information for lane guidance as well as positioning applications. This may include lane dividers, medians, obstacles and the like.

An object 408 in reality can be detected by the vehicle using sensors like cameras, lasers, or radars of the type described in connection with US 2008/0243378. Once the object 408 is detected, it is identified and mapped to a nearby marker 400 on the map. Once synchronization is achieved, in-vehicle systems can use map database for ADAS and lane positioning applications. By identifying the marker 400, the vehicle 402 can correct its position in relation to the objects in a cross-section 410 map database. The vehicle 402 'knows' its precise lateral position in relation to the roadway 406. This is possible because the relative positioning between vehicle 402 and marker 400 is of high precision. Since vehicle 402 is positioned in relation to the axis 404 and the object 408 is positioned in relation to the axis 404, events recorded on the cross-section 410 can be used by the vehicle 402 to navigate. By changing means of indicating voice command placement from graph geometry (current approach) to directly storing them as cross-section 410 in the map database, dynamic applications are more easily enabled, for example delivering detour information to vehicle, dynamic signs, accident markings, congestions etc.

FIG. 12 illustrates how the cross-sections 410 can be created as a static layer of the database and/or a dynamic layer 412 provided by service providers. As a dynamic layer 412, these cross-sections can be distributed by means of GPS or digital radio and can contain information about road works, traffic jams, accidents, etc. The advantage of such an approach is that the static objects 408, i.e., permanent, and dynamic objects 414, i.e., transient, are for all practical purposes treated as the same types of objects, meaning that all decision algorithms can be written in a uniform way and the decisions are made based on information contained merely in the cross-section 410, 412, rather than on any particular type of cross-section.

Figure 13:
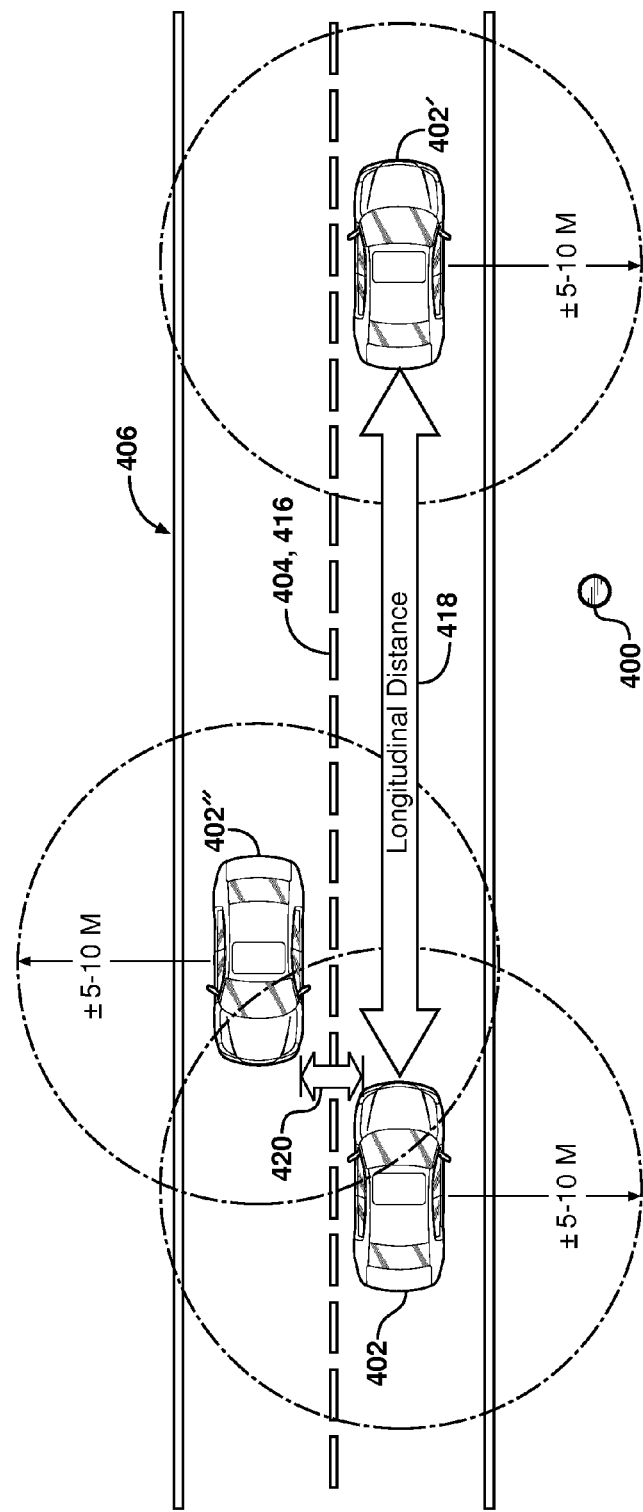
FIG. 13 is a simplified top view of a section of roadway depicting the typical 5-10 meter margin of error which exists in consumer-grade portable navigation systems such that their absolute (x, y) coordinate positions cannot be located more precisely on a consistently reliable basis.

FIG. 13 depicts, from a bird's eye view, bi-directional traffic on a roadway 406 wherein opposing lanes of traffic are separated by double unbroken stripes 416. In this example, the stripes 416 coincide with the reference axis 404. FIG. 13 demonstrates a fundamental nature of vehicular traffic, wherein vehicles 402, 402' traveling in the same direction in the same lane typically keep a separation of 15-30 meters. This is represented by the longitudinal distance arrow 418. However, the separation between vehicles 402, 402" in adjacent lanes is typically below two meters and sometimes below one meter, as represented by the lateral arrow spacing 420. The accuracy of a typical GPS unit is in the order of 5-10 meters using current generation, consumer grade navigation systems. This error range of 5-10 meters is represented by the broken circles circumscribing each of the vehicles 402, 402'

402" shown in FIG. 13. Thus, if each vehicle 402, 402', 402" illustrated in FIG. 13 is equipped with a personal navigation system having a GPS receiver, that vehicle's actual location in x, y coordinates can reliably be positioned somewhere within the respective circumscribed circles. For vehicles 402, 402' traveling in the same lane in the same direction, this is not an issue due to the natural extended longitudinal spacing 418. Therefore, for purposes of collision avoidance and other techniques employed in advanced driver assistance settings, the +/−5-10 meter error range is more than adequate for longitudinally spaced vehicles 402, 402' in the same lane. However, due to the very small lateral spacing constraints 420, the normal accuracy of a consumer-grade GPS unit is not at all adequate for purposes of collision avoidance. Thus, the vehicles 402, 402" could very easily trigger a false collision warning if only the absolute positioning provided by the GPS receiver were used to determine the probability of an imminent collision. This, of course, is unacceptable.

Figure 14:
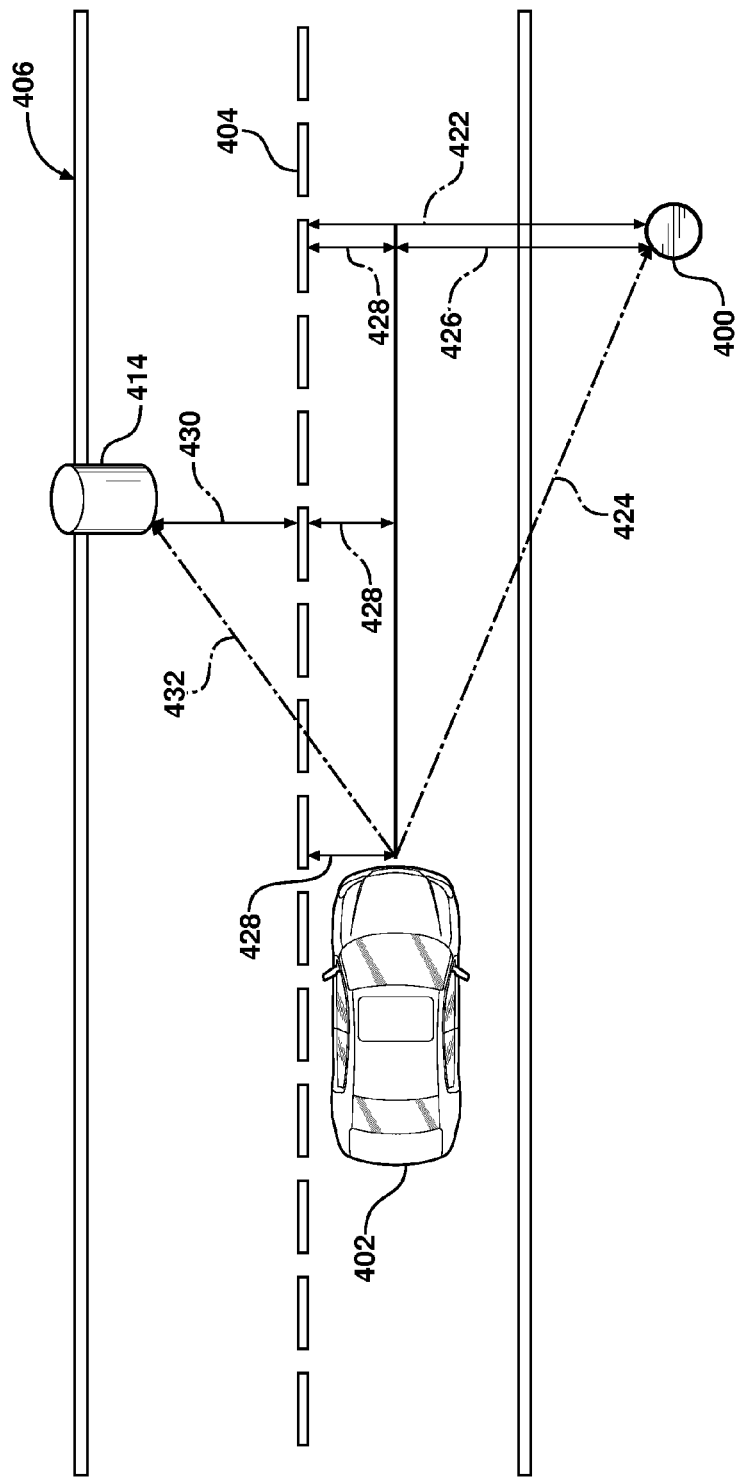
FIG. 14 shows a vehicle equipped with a personal navigation device according to this invention traveling a roadway in which a marker has been spatially located in relation to a reference axis and which enables the vehicle's lateral position relative to the centreline to be determined with precision, together with a lateral offset for other sensed objects of relevance to the driver.

Referring now to FIG. 14, an enlarged view of the roadway 406 is depicted wherein an onboard sensor associated with the vehicle 402 has sensed the existence and identity of marker 400 by comparing its digital signature to a catalogue of object references stored in a digital map database. Upon identifying the unique marker 400, the navigation system contained in the vehicle 402 obtains its object offset measurement 422 which is stored in the digital map database and associated with the particular marker 400. The onboard vehicle sensor also assesses the relative bearing/range to the marker 400, as illustrated by broken arrow 424. A lateral component 426 of that relative bearing/range 424 can then be subtracted from the known object offset 422 so as to calculate an instantaneous vehicle offset 428, the instantaneous vehicle offset is thus the perpendicular distance measurement between the reference axis 404 and the vehicle 402. Through this simple assessment of the sensed relative bearing/range 424 to the known marker 400, the instantaneous vehicle offset 428 can be very quickly and easily computed using minimal processing resources. This quick calculation of the lateral, instantaneous vehicle offset 428 thus enables advanced driver assistance operations such as collision avoidance and other advantageous services, without requiring its very precise x, y coordinates to be calculated.

By extension, this technique can be used to quickly compute a new object offset 430, which is generally defined as a perpendicular distance measurement between the reference axis 404 and a new object 408, 414, which is sensed by the onboard sensors of the vehicle 402. In FIG. 14, a dynamic object 414 is depicted as a construction barrel which is encountered by the vehicle sensors and its relative bearing/range quickly determined, as represented by broken vector 432. Using the instantaneous vehicle offset 428, together with the sensed relative bearing/range 432, the new object offset 430 is computed. This information can then be entered into a cross-section 412 as described above.

Figure 15:
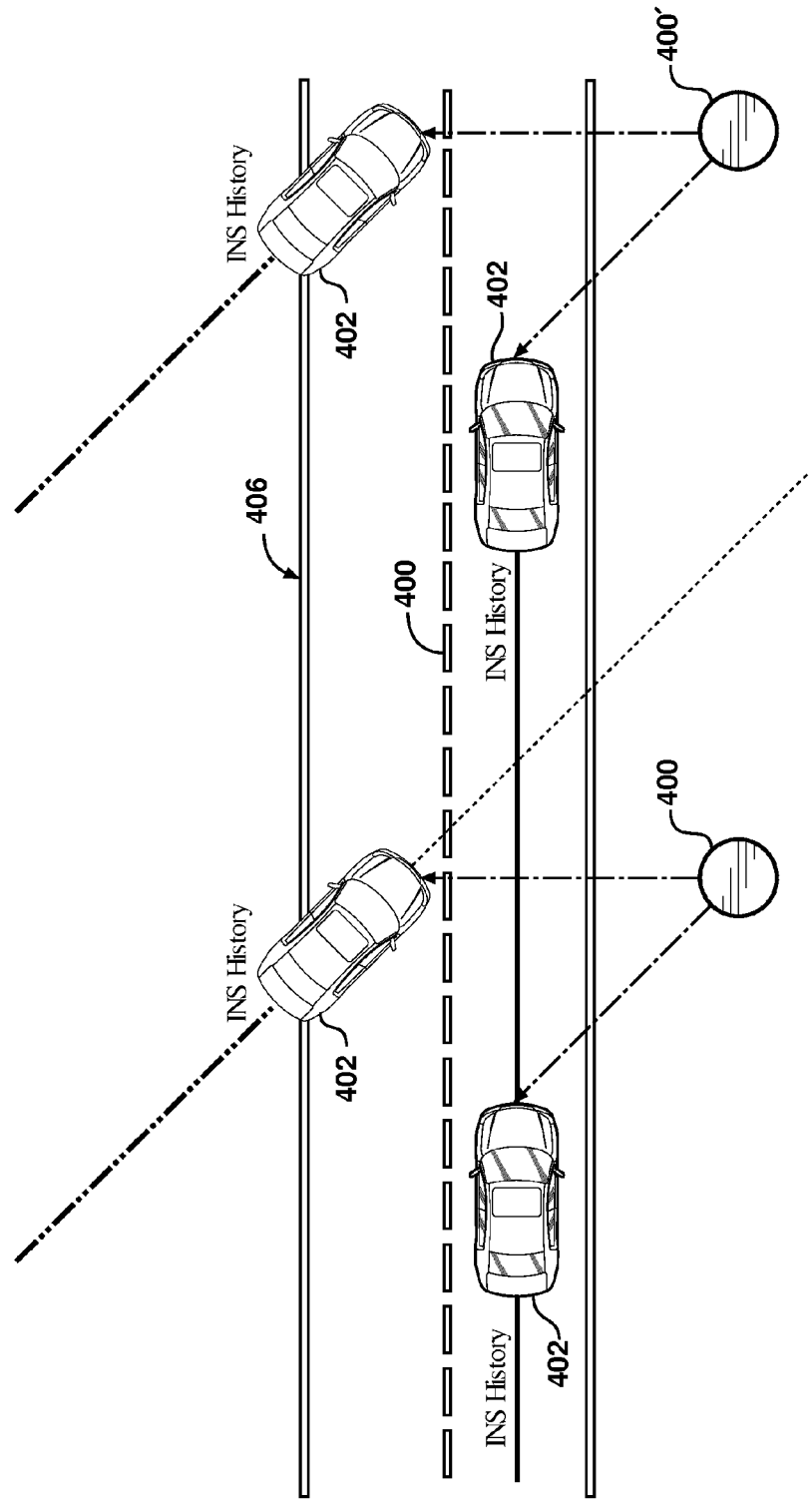
FIG. 15 is a simplified view depicting the method by which vehicle position in relation to a single, axis-symmetrical marker may be established using inertial navigation system (INS) history.

FIG. 15 depicts a single, axis-symmetrical marker 400 which is sensed by the vehicle sensor. Because of the markers' symmetry, in this example it is not possible to calculate the correct heading of the marker, or by extension the correct heading of the vehicle 402. In order to correctly position the vehicle 402 on the lane, the following items must be known: previous recordings of the INS (history) and characteristic of INS drift. Positioning starts by use of the GPS signal and standard map matching. This gives the system an estimation of position along the INS signal. When the first marker 400 is detected, the history of INS is used to position the vehicle 402 on the lane. This can be done, because the drift of the INS is known. When the second marker 400' is detected, the INS history is used again, calculating a better position. From that point, a set of the few last-detected markers 400, 400', . . . , and INS history is always used to calculate the vehicle's position in relation to a new marker. Also one can use the assumption that the most probable long-term trajectory is parallel to the axis 404 to further improve the positioning in this case.

Figure 16:
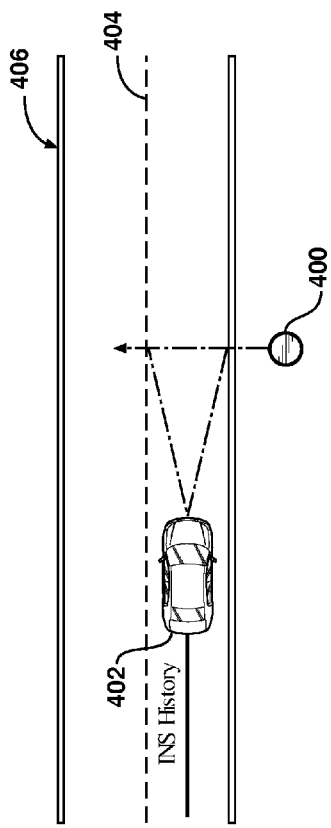
FIG. 16 depicts the method by which a vehicle's lateral offset relative to the centre line can be calculated by reference to a single, non axis-symmetrical marker.

FIG. 16 shows a single, non axis-symmetrical marker. In this case, the marker 400 does not have axis-symmetry and is large enough for the system to distinguish between its features. Examples of such objects include large direction sign boards or advertisement boards. Such markers 400 must be associated with additional information about their real world dimensions in order for the system to detect it correctly. Because the marker 400 features are distinguishable, the vehicle 402 can position itself to each to the features, immediately acquiring the correct heading.

Figure 17:
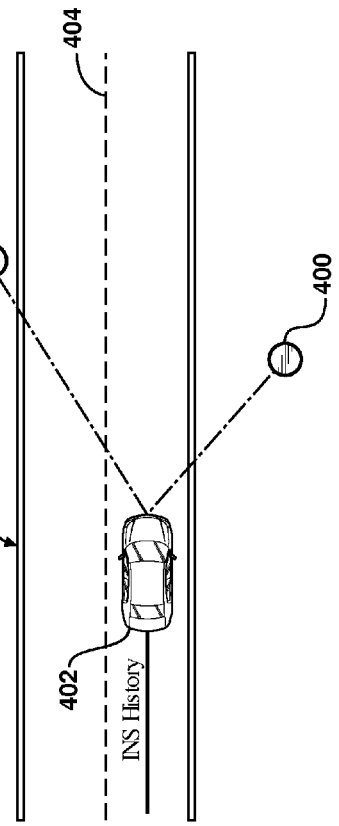
FIG. 17 depicts a scenario in which conjugate, axis-symmetrical markers are available to spatially locate the lateral offset of a vehicle relative to the reference axis.

FIG. 17 illustrates a scenario in which there are two or more markers 400, 400' existing close enough to meet the error model. In such case, the vehicle 402 positions itself against those objects, receiving the correct position and heading on the lane.

Figure 18:
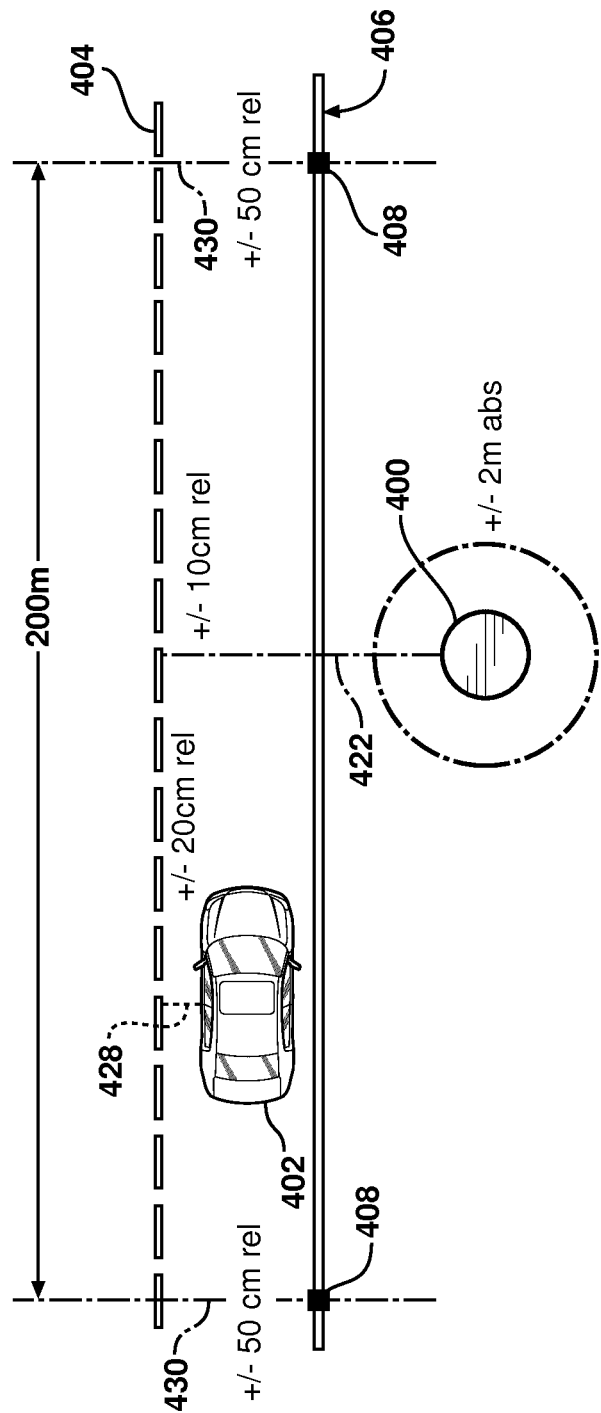
FIG. 18 illustrates an exemplary error model depicting the accuracy ranges of an embodiment of this invention relative to the reference axis.

FIG. 18 is an error model. Consistent and a known error model in the neighborhood of a marker 400 allows new lane guidance possibilities. Here, marker 400 has an absolute positioning of +/−2 m, but is positioned relative to reference axis 404 with accuracy of +/−10 cm. In the neighborhood of the marker 400 (i.e., +/−100 m), objects on respective cross-sections 410 are positioned relatively to the marker 400 with accuracy of +/−50 cm along the axis 404. A vehicle 402 is positioned +/−20 cm in cross distance the to centreline 404.

Thus, the vehicle 402 can be positioned relatively to the axis 404 with accuracy of +/−20 cm. A cross-section 410 can indicate with which marker 400 it is relatively positioned. The error values are consistent in the area of marker neighborhood. The marker 400 could have a higher absolute positioning error, but that does not limit the ability for a vehicle 402 to be accurately positioned in relation to the roadway geometry and other database objects.

Adding new objects 414 representing dynamic content in relation to markers 400 allows for in-vehicle devices and applications of dynamic content. External objects 414 can be added to the model even if they don't meet the relative error criteria. Using relative map matching algorithms, such objects 414 can be positioned relative to the reference axis 404 and provide information to vehicles 402. Such objects 414 can be dynamically distributed by service providers over a GSM network or digital radio channels or the like. Dynamic objects 414 might include such things as variable signs content (warning and limits), road constructions and other limitations, accident information, damage road sections, and the like.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD ROMs, microdrive, and magneto optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method for vehicle navigation using the vehicle's lateral offset from a common reference axis, said method comprising the steps of:
providing a digital map database containing stored absolute geographic location and relative spatial location for a plurality of objects, said objects including a longitudinally extending roadway, a marker disposed adjacent to the roadway, and a reference axis spatially associated with and extending generally parallel to the roadway, said digital map database further including an object offset stored therein, said object offset comprising the perpendicular distance measurement between said reference axis and said marker;
providing a vehicle configured to travel along the roadway, the vehicle transporting therewith a navigation system enabled by at least one object sensor;
sensing the existence, identity, and relative bearing/range to the marker using at least one object sensor; and
calculating an instantaneous vehicle offset using the stored object offset and the sensed relative bearing/range to the marker, the instantaneous vehicle offset being the perpendicular distance measurement between the reference axis and the vehicle.

2. The method of claim 1, further including determining an initial absolute geographic position of the vehicle relative to the digital map database.

3. The method of claim 1, further including sensing the relative bearing/range to an encountered new object, and calculating a new object offset, wherein the new object offset is the perpendicular distance measurement between the reference axis and the new object.

4. The method of claim 3, wherein the new object comprises a second vehicle traveling the roadway.

5. The method of claim 1, wherein said step of sensing the existence, identity, relative bearing/range to the marker includes matching the sensed marker with an object stored in the digital map database.

6. A system for vehicle navigation using its lateral offset from a common reference axis, said system comprising:

a digital map database containing stored absolute geographic location and relative spatial location for a plurality of objects, said objects including a longitudinally extending roadway, a marker disposed adjacent to the roadway, and a reference axis spatially associated with and extending generally parallel to the roadway;
said digital map database further including an object offset stored therein, said object offset comprising the perpendicular distance measurement between said reference axis and said marker;
at least one object sensor for sensing the relative bearing/range to said marker; and
a portable navigation device operatively interconnecting said object sensor and said digital map database for calculating an instantaneous vehicle offset using the stored object offset and the sensed relative bearing/range.

7. The system of claim 6, wherein said portable navigation device includes an absolute position sensor configured to determine an initial absolute geographic position relative to said digital map database.

8. The system of claim 6, wherein said marker includes an RFID identifier.

9. The system of claim 6, wherein said marker comprises a street sign.

10. The system of claim 6, wherein said marker comprises a road marking.

11. The system of claim 6, furthering including a communicator for communicating with another nearby navigation system to compute a possible collision.

12. The system of claim 6, wherein said communicator includes at least one remote server for performing off-board computations.

13. A non-transitory computer data carrier having stored thereon instructions which, when carried out by one or more processors of a vehicle navigation system, cause the one or more processors to perform the method of claim 1.

14. The method of claim 1 further comprising receiving content broadcast to the vehicle.

15. The method of claim 14, wherein the content is used by an advanced driver assistance system within the vehicle.

16. The method of claim 15, wherein the advanced driver assistance system provides real-time lane guidance for the vehicle.

17. The system of claim 6 further comprising an advanced driver assistance system (ADAS) to provide real-time lane guidance vehicle navigation.

18. The system of claim 17, wherein the ADAS uses a distance to centerline to determine a vehicle lane departure or detect a collision for the vehicle.

* * * * *